(12) United States Patent
Gratson et al.

(10) Patent No.: US 7,884,550 B2
(45) Date of Patent: Feb. 8, 2011

(54) ARC TUBE COMPOSED OF YTTRIUM ALUMINUM GARNET CERAMIC MATERIAL

(75) Inventors: Gregory M. Gratson, Ballston Lake, NY (US); James A. Brewer, Scotia, NY (US); Venkat S. Venkataramani, Clifton Park, NY (US); Mohamed Rahmane, Clifton Park, NY (US); Svetlana Selezneva, Schenectady, NY (US); Sairam Sundaram, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 1128 days.

(21) Appl. No.: 11/557,165

(22) Filed: Nov. 7, 2006

(65) Prior Publication Data
US 2008/0122362 A1 May 29, 2008

(51) Int. Cl.
*H01J 17/16* (2006.01)
*C04B 35/50* (2006.01)
*C04B 35/51* (2006.01)
*C04B 35/00* (2006.01)

(52) U.S. Cl. .................. 313/636; 313/493; 501/152; 501/153

(58) Field of Classification Search .................. None
See application file for complete search history.

(56) References Cited

U.S. PATENT DOCUMENTS

| 4,841,195 A | 6/1989 | De With et al. |
| 4,861,737 A | 8/1989 | Prud'Homme van Reine et al. |
| 4,923,420 A | 5/1990 | De With et al. |
| 6,447,937 B1* | 9/2002 | Murakawa et al. .......... 428/696 |
| 6,583,563 B1 | 6/2003 | Venkataramani et al. |
| 6,844,285 B1 | 1/2005 | Wei |
| 7,022,636 B2* | 4/2006 | Hamada et al. ............. 501/152 |
| 2005/0215419 A1* | 9/2005 | Takagimi et al. ............ 501/152 |
| 2006/0100088 A1 | 5/2006 | Loureiro et al. |

FOREIGN PATENT DOCUMENTS

GB 2 138 802 10/1984

OTHER PUBLICATIONS

Naoya Matsushita et al, *Precipitation and Calcination Processes for Yttrium Aluminum Garnet Precursors Synthesized by the Urea Method*, J. Am. Ceram. Soc., 82 [8] 1977-84 (1999).
Akio Ikesue et al, *Fabrication of Polycrystalline, Transparent YAG Ceramics by a Solid-State Reaction Method*, J. Am. Ceram. Soc., 78[1] 225-28 (1995).

* cited by examiner

*Primary Examiner*—Toan Ton
*Assistant Examiner*—Britt D Hanley
(74) *Attorney, Agent, or Firm*—Mary Louise Gioeni

(57) ABSTRACT

A transparent sintered yttrium aluminum garnet ceramic material formed from a solid-state reaction of a mixture of yttrium oxide powder and aluminum oxide powder during sintering. The ceramic material preferably has an in-line transmission of greater than 75% so it may used to fabricate arc tubes for high intensity discharge lamps used in automotive headlamps.

9 Claims, 5 Drawing Sheets

ARC TUBE COMPOSED OF YTTRIUM ALUMINUM GARNET CERAMIC MATERIAL

FIELD OF THE INVENTION

An embodiment of the invention pertains to ceramic materials and methods of manufacturing ceramic components used in lighting applications. More specifically, this invention relates to high intensity discharge lamps and the ceramic materials used to manufacture such lamps.

BACKGROUND OF THE INVENTION

High intensity discharge ("HID") lamps are typically used when high levels of light are needed over large areas such as gymnasiums, warehouses, parking lots etc. The HID lamps provide high lumen output and high-energy efficiency. Within the automotive industry, HID lamps are replacing conventional incandescent halogen lights used for automotive headlamps. In an HID lamp, light is generated by means of an electric discharge that takes place between two metal electrodes enclosed within a sealed envelope or arc tube. At least with respect to automotive headlamps, the arc tube is composed of quartz, because quartz has a relatively high in-line transmission of light at wavelengths within the visible light spectrum.

The discharge medium in quartz metal halide lamps consist of a mixture of xenon, mercury, sodium iodide (NaI) and/or scandium iodide ($ScI_3$), wherein the surrounding envelope, or arc-tube, is made of quartz with tungsten electrodes protruding within the envelope. In operation, the lamp size is kept small enough for optical coupling purposes. Further, the lamps are required to meet the automotive industry standard of starting fast by delivering at least eighty percent of their steady state lumens no later than four seconds from the point at which they are turned on. The small lamp size and fast start requirements result in higher wall thermal loading, which in turn poses some limits on the quartz envelope material, and significant thermal stresses in the arc-tube, especially near the electrode roots. These limitations result in shortening the lamp life and also decreasing reliability of the lamp.

Ceramic materials, such as polycrystalline alumina (PCA) and yttrium aluminum garnet (YAG) are some times used as an envelope material in HID lamps. Ceramic arc tubes can withstand higher temperatures; and, the cold spot temperature in ceramic lamps can be driven to a high enough value to evaporate the metal halide dose and produce enough vapor pressure for both the light emitting elements and the buffer gas. However, these ceramic materials are not as transparent, or translucent as quartz, and have lower in-line transmission of light than quartz. The highest reported inline transmission of quartz is 91%, while the maximum theoretical inline transmission for YAG is 83%. This is due to the difference in refractive index of the two materials, with quartz having a lower value than YAG (1.52 vs. 1.84). The YAG ceramic material has a higher in-line transmission than the PCA, because of its cubic crystal structure; however, YAG ceramic arc tubes used in general lighting applications, such as high-pressure sodium lamps, have an in-line transmission less than 50%. Such transparency is not suitable for HID lamps used in optical applications such automotive headlamps. Previously developed YAG arc tubes were also too expensive to compete with PCA, even though they had superior corrosion resistance against high-pressure sodium dose chemistries.

Arc tubes are produced and sold that are composed of a YAG ceramic material that have a reported in line transmission over 80%; however, such arc tubes are less suitable for use with optical applications such as automotive headlamps. These arc tubes are fabricated using a molding or shaping process known as slip casting. The slip casting process is limited to the production of the arc tube shape including an oval shape of the arc body as shown in FIG. 1. This configuration limits the flexibility of where the electrode tip is positioned with the arc tube chamber. That is, the sloped configuration of the neck portion positions the neck portion close to the electrode. In a ceramic arc tube shown in FIG. 1, the highest stress point on the arc tube wall is located at the center of the chamber wall. This stress, which is caused by thermal gradients, can be managed by carefully choosing the right dimensions (inside diameter, thickness and length) of the chamber. An additional high stress point is found in the neck portion of the arc tube. The location and stress value of this additional stress point are very sensitive to the position of the tungsten electrode tip with respect to the neck portion. This stress point imposes a further limitation in the design of the arc tube, and compromises the life and performance of the lamp leading to a less robust design.

Other shapes have been used for arc tubes such as the box-like configuration shown in FIG. 2, which is used for general lighting applications and not automotive headlamps. As compared to arc tube chambers for automotive headlamps, the arc tube chamber is larger, typically greater than 5 mm, and the wall thermal load is much lower at 40 watts/$cm^2$. The arc tube chamber for an automotive headlamp is 2 mm or smaller and has a wall thermal load of about 120 watts/$cm^2$. Such a configuration has been used in arc tubes composed of polycrystalline alumina; however, it has not been used to produce YAG arc tubes.

In a paper entitled *Precipitation and Calcination Processes for Yttrium Aluminum Garnet Precursors Synthesized by the Urea Method*, J. Am. Ceram. Soc., 82[8], 1977-1984 (1999), there is disclosed a method for making YAG using a wet chemistry that generally includes the addition of yttrium chloride and aluminum chloride in a given concentration of ammonium sulfate and urea. This solution is stirred at 95° C., and upon cooling, a YAG precipitate is formed that can be rinsed and calcined. Powders produced through wet chemistry processes are more expensive than engineering grade alumina powders, which corresponds to a higher price for arc tubes produced using this method over PCA.

YAG may be created in a solid-state reaction, in which an yttrium oxide powder is mixed with aluminum oxide powder and ethyl silicate as disclosed in the article *Fabrication of Polycrystalline, Transparent YAG Ceramics by a Solid State Reaction Method*. J. Am. Ceram. Soc., 78 (1) 225-228 (1995). A powder mixture of yttrium oxide and aluminum oxide was milled for a predetermined amount of time and dried to powder form. The powder mixture was then isostatically pressed to form ceramic discs. The discs were sintered and the YAG was formed during the sintering process. However, it is uncertain whether such a powder mixture can be manipulated to form more complex shapes as through extrusion or injection molding, because the shaped discs were formed through isostatic pressing. The $Y_2O_3$ and $Al_2O_3$ powders used to form YAG were synthesized via alkoxide precipitation and pyrolysis. Such powders may have a high surface area that would limit their use in forming processes such as extrusion or injection molding and will also be more costly than engineering grade powders. The grain size (about 10 μm) achieved using this method is larger in diameter than desirable for certain applications such as automotive headlamps, where a smaller grain size (less than 5 μm) and an associated higher mechanical strength are required.

Another solid-state reaction to form YAG is disclosed in U.S. Publication No. 2006/0100088 A1 for a transparent multi-cation ceramic. The method disclosed in this publication uses nanopowders having particle sizes of less than 1 micron, and preferably below 500 nm. The YAG ceramics described in this published application were observed to have an inline transmission of only 65%. The publication does not disclose results achieving 80% in-line transmission. Moreover, nanopowders are expensive, increasing the cost of production of ceramic components. In addition, nanopowder mixtures have greater particle surface area and require more water to hydrate the powders to create a moldable mass. Such a mass is difficult to use in extrusion or injection molding processes.

BRIEF DESCRIPTION OF THE INVENTION

An embodiment of the present invention encompasses a composition that may be used to make a transparent yttrium aluminum garnet ceramic material, which has an in-line transmission sufficient to meet the requirements of optical applications such as automotive headlamps. The composition may include an amount of yttrium oxide powder combined with an amount of aluminum oxide powder, wherein the yttrium oxide powder has a particle surface of about 9 $m^2/g$ to about 36 $m^2/g$; and, the aluminum oxide powder has a surface particle area of about 3 $m^2/g$ to about 30 $m^2/g$. The yttrium powder preferably has a particle surface area of about 18 $m^2/g$. The powder mixture may be doped with $SiO_2$ and MgO in order to promote densification and control grain growth when the composition is sintered.

The doped powder mixture is milled to form a homogeneous mixture. Arc tube components, including legs and arc bodies can be formed using extrusion, injection molding, slip casting or uniaxial/isostatic pressing. The components are preferably pre-sintered at different temperatures so the legs undergo more shrinkage than the arc body, and yttrium aluminum garnet is created in the legs. After the components are cooled, they undergo a co-sintering schedule in which yttrium aluminum garnet is created in the arc body, which shrinks more than the legs placing a compressive stress on the legs. This compressive stress drives diffusion between the material in the body and legs, effectively fusing the body and legs together with an undetectable interface.

In this manner, transparent yttrium oxide and aluminum oxide powder mixture is formed at less cost than present methods, and the powder mixture can be readily shaped using known forming methods as extrusion, injection molding, slip casting and pressing. A transparent YAG ceramic can be fabricated that has a high level of transparency sufficient for use in optical applications such as automotive headlamps. Such a ceramic may be used instead of quartz, because YAG is more thermally stable at higher temperatures.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings.

DESCRIPTION OF THE INVENTION

Figure 4:
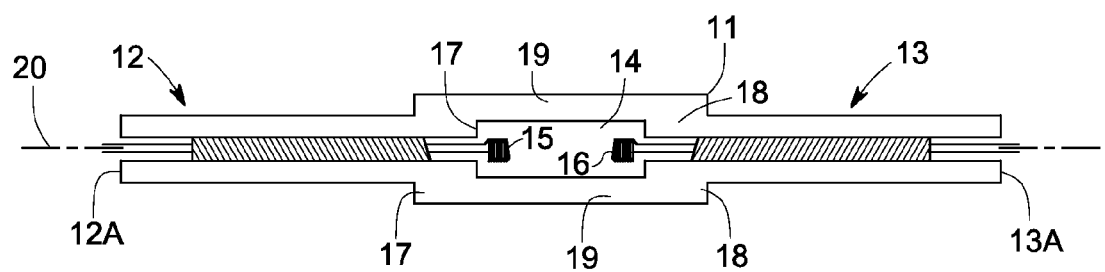
FIG. 4 is a sectional view of a YAG arc tube after the components have undergone sintering.

With respect to FIG. 4, a sectional view of an arc tube 11 for a high intensity discharge lamp is illustrated. The arc tube 10 has a typical construction for high intensity discharge lamp including an arc body 11. A first leg 12 and a second leg 13 are integrally connected to the arc body 11. Each leg 12 and 13 extends from an opposing side of the body 11. A first electrode 15 and second electrode 16 extend through the first leg 12 and second leg 13 respectively and terminate in a chamber 14 formed in the arc body 11 of the lamp 10. The tips of the electrodes are spaced apart a determined distance within the chamber 14, forming an arc region between the electrode tips. The chamber 14 is sealed under pressure at the free ends 12A and 13A of the legs 12 and 13 distal the chamber.

In an embodiment of the present invention the arc body 11 and/or the legs 12 and 13 are composed of a transparent, polycrystalline yttrium aluminum garnet that is produced from a sinter-induced solid-state reaction of a stoichiometric mixture of an yttria powder and alumina powder. This powder mixture may be doped with $SiO_2$ and MgO, and sintered to produce the yttrium aluminum garnet (YAG) having a high level of transparency that can be easily processed to form desired shapes, as the arc body 11 and legs 12 and 13, through extrusion and other methods. Ceramic discs having this yttrium aluminum garnet composition were fabricated and tested to consistently show in an in-line transmission of greater than seventy-five percent (75%).

In the preparation of the YAG, an amount of yttrium oxide ($Y_2O_3$) powder is combined with an amount of aluminum oxide ($Al_2O_3$) powder. The powders used in the fabrication process are preferably inexpensive, engineered-grade high purity powders. For example, the yttria powder may be purchased from Pacific Industrial Development Company ("PIDC") located in Ann Arbor, Mich., which powder has a particle surface area of about 2 $m^2/g$ to about 3 $m^2/g$. The alumina powder may be obtained from Baikowski USA, located in Pittsburgh, Pa., and has a particle size of about 0.3 microns to about 0.4 microns, and a particle surface area 10 $m^2/gram$, which is consistent with alumina powders used to fabricate polycrystalline alumina for ceramic metal halide lamps. The particular ratio of particle surface area of 18:10, yttria to alumina, is preferred; however, the particle surface area of yttrium oxide may range from about 9 $m^2/g$ to about 36 $m^2/g$, and the particle surface area of aluminum oxide may range from about 3 $m^2/g$ to about 30 $m^2/g$.

Stoichiometric amounts of the yttrium powder and aluminum powder are combined. For example, in tests conducted in the fabrication of ceramic discs and arc tube components, about 200 grams of yttria powder was combined with about 144.6 grams of the alumina powder to achieve a 3:5 molar ratio of yttrium to aluminum. Prior to mixing the powders, the yttria powder was ball milled for about forty-eight hours to reduce particle size and increase the surface area to about 18 $m^2/g$ of powder. The particle surface area of the yttria powder is thereby increased to make the yttria powder more reactive in a sintered induced solid-state reaction.

Sintering aids, or dopants, including $SiO_2$ and MgO, are added to the powder mixture. The $SiO_2$ was added in the form of a liquid tetraethylorthosilicate. In particular, 0.77 grams of the liquid tetraethylorthosilicate was added to the powder mix. In addition, MgO in the form of the salt, magnesium acetate, is added to the powder mix. In particular, 1.8 grams of the magnesium acetate was added to the powder mixture. These respective amounts of the silica and magnesium dopants were added to achieve a desired concentration of about 420 ppm by weight of Si to YAG and 270 ppm by weight of Mg to YAG. Other concentrations of the dopants may also be used in the YAG ceramic. For example the concentration of Si may be in the range of 200 ppm to 500 ppm by weight of Si to YAG; and, the concentration of Mg may be in the range of 150 ppm to 600 ppm by weight of Mg to YAG.

Approximately 0.5 liters of ethanol was then added to the mixture of the yttria powder, alumina powder and dopants. The mixture was shaken and then roll-milled for about twelve hours to homogenously disperse the dopants in the powder mixture. Known mixing and milling techniques such as energy mixing, vibratory mixing, static mixing, jet milling, ball milling and the like may be used. A YAG medium was used during the shaking and roll-milling procedures. Typical media used in shaking and milling procedures when manufacturing ceramics from powders include alumina media and/or zirconium media; however, it was determined that such media used in the present application may contaminate the mixture and alter the stoichiometry of the reaction during the sintering process, adversely affecting the transparency of the ceramic discs. The YAG media may be produced using the method or process described herein, including the below-described sintering schedule.

After milling, the mixture was dried in an oven for four hours, and then broken down to a powder consistency using a 200-mesh sieve or screen. Non-limiting examples of drying methods that may be used, but are not limited to, temperature assisted drying, spray drying, freeze drying and reduced pressure drying of the mixture.

A uni-axial die press was used to form discs that had a diameter of about 2.5 cm and were 2 mm thick. Other shaping systems or methods may be used, for example, injection molding, extrusion systems, slip casting and pressing are commonly used in forming components for discharge lamp arc tubes. The discs were then heated at a temperature of 1050° C. for about two hours under atmospheric conditions to burn off any residual organic compounds or other contaminants, and later cooled to room temperature. This pre-firing, or pre-sintering, may be carried out in the range of about 500° C. to about 1100° C. The pre-sintering temperature and time cycle used will depend on the level of contaminants and the thickness of the ceramic samples.

The YAG discs produced were determined to have a green density of about fifty percent (50%) to about sixty percent (60%) YAG. The term green density as used herein shall refer to the percentage of oxide powder mixture that makes up the volume of an article after that article has been formed and heated to burn off any contaminants, and prior to sintering.

Sintering of the discs, or sintering of arc tube components as described below, may be conducted in or under reduced pressure (vacuum), ambient air, inert gas, reducing gas, oxidizing gas, or mixtures of such gases. Non-limiting examples of inert gases include, but are not limited to, argon and helium. Reducing gases include but are not limited to, dry or wet $H_2$, $N_2$, and CO/CO mixtures. Oxidizing gases include, but are not limited to, $O_2$ and $O_3$. Generally, sintering is conducted at a temperature in a range from about 1000° C. to about 2100° C. for a time ranging from 0.5 hours to 24 hours. The rate of heating to the sintering temperature may vary and should have no significant deleterious effect on the green body. Generally, heating rates are in a range from about 1° C./min to about 10° C./min. The controlled pressure used for sintering is in a range from about $10^{-8}$ torr to about $1.6 \times 10^6$ torr. Sintering conditions are chosen to achieve a desired density and grain size, and depend on the particular materials system and thickness of the samples. Sintering conditions are also chosen to achieve complete pore filling, densification to a desired density value, and to confine the final grain size.

By way of example, the discs were sintered under vacuum to facilitate a solid-state reaction to produce the yttrium aluminum garnet ceramic. The discs were heated in a furnace at a pressure of about $10^{-5}$ torr. The temperature of the furnace was increased at a rate of 300° C./hour to 1300° C., which was maintained for a resident time of about two hours to five hours. The temperature was then increased at a rate of about 100° C./hour to 200° C./hour to 1500° C., which was maintained for a resident time ranging from about two hours to five hours. The temperature was then increased at a rate of about 100° C./hour to 200° C./hour to about 1800° C., which was maintained for a resident time of about five hours. Under these conditions, the mixture undergoes a solid-state reaction to form the yttrium aluminum garnet ceramic.

The discs were allowed to cool to room temperature. A particular rate of cooling was not used; one may incorporate different rates for cooling. The discs were then isostatically pressurized under heat at 1800° C. at 25,000 psi for a resident time of about 2 hours. Other discs were isostatically pressed at room temperature; however, it has been determined that a hot isostatic pressurization may more efficiently remove residual porosity to achieve a higher level of transparency. In addition, the discs were annealed to remove any discoloration of the ceramic. For example, the discs were annealed at 1200° C. under atmospheric conditions for twenty-four hours.

The sintering schedule produced discs composed of ceramic YAG having grain sizes ranging from about 3 microns to about 10 microns. By way of example some discs sintered at 1800° for five hours or less had an average grain size from about 3 µm to about 6 µm. Increasing the sintering temperature and the resident time for sintering generally resulting in increased grain size. For example, one disc sintered at 1800° C. for two hours had a grain size of 3.24 µm; a second disc sintered at 1800° C. had a grain size of 3.83 µm; and, a third disc, which was a control disc, made as described above, was sintered at 1800° C. for eight hours had a grain size of 3.79 µm.

The in-line transmission of the discs was tested using a spectrophotometer that collected ultraviolet and infrared light in the visible light spectrum range of 400 nm to 800 nm. The discs consistently had an in-line transmission greater than 75% at a wavelength of 550 nm. The term "in-line transmission" as used herein is understood to mean the ratio of the intensity of transmitted light to the intensity of incident light, obtained when a parallel beam of light of a certain intensity is incident perpendicular to the surface of a sample of given thickness. In the present embodiment, the in-line spectral transmission is determined on a polished plate of sintered body having a thickness of 1 mm at a wavelength of 554 nm.

The above described oxide powder mixture and sintering schedule may also be used to fabricate arc tube components, including legs and arc bodies. After the mixture is dried the resulting mass is broken down into powder form. Prior to the sintering process, the arc tube components are preferably formed by extrusion of a moldable mass formed by adding a binder, lubricant and water to the mixture. As noted above, other forming methods or systems, such as injection molding, slip casting and pressing may be used to form the components. An acceptable binder used to form the extruded parts is Zetag 7529, which may be obtained from Ciba Specialty Chemicals. The lubricant may be butyl stearate, which can be obtained from any one of several known sources. After the components are extruded, the legs and arc body are heated at a temperature of 1050° C. for about two hours, under atmospheric conditions, in order to burn off contaminants including, but not limited to, the binder and lubricant.

The extruded components then undergo a sintering process to convert the yttrium oxide and aluminum oxide mixture into YAG. During the sintering process, the legs and the arc body undergo differential shrinkage securing the legs and the arc body together. The legs are pre-sintered at 1525° C. for about two hours. This pre-sintering step may be carried out at temperatures ranging from about 1000° C. to about 1600° under various time schedules. The selected temperature and the time schedule may depend on the size of the components and desired level of transparency required. The pre-sintering of legs causes a solid-state reaction of the mixture to form YAG, and causes the legs to shrink about ten percent (10%) overall in size. In as much as the arc body is not pre-sintered, the oxide mixture making up the arc body is not converted to YAG, and the arc body has not shrunken.

Figure 3:
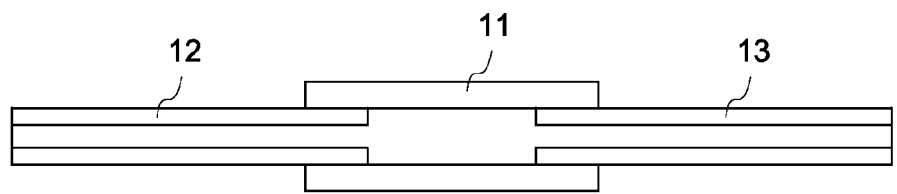
FIG. 3 is a sectional view of extruded arc tube components before sintering is initiated to convert the composition of the components to YAG.

After the components are cooled to room temperature, the legs are inserted into the arc body, and the components are co-sintered according to the above described sintering schedule. With respect to FIG. 3, a sectional view of arc tube 10 components including legs 12 and 13 inserted into an arc body 11 prior to beginning the below-described sintering process. Arc tubes fabricated for testing generally included dimensions consistent with dimensions of HID lamps used as automotive headlamps. However, the dimensions of the arc tube and the components before and after sintering may differ from the below described dimensions depending on various known factors such as the field application of the arc tube, the dose composition used to generate light and the desired chamber size of the arc tube.

The components including the legs 12 and 13 and arc body 11 have a tubular configuration. Prior to the above-described pre-sintering, the legs 12 and 13 typically ranged from about 12 mm to about 15 mm in length and had an outside diameter of about 3 mm. The arc tube was also about 12 mm to about 15 mm in length, which tube had an outside diameter of 4.5 mm and an inside diameter of about 2.5 mm. During the pre-sintering stage, the outside diameter of the legs shrinks to about 2.5 mm and the composition of the legs are converted to YAG. The arc body 11 and legs 12 and 13 overlapped one another about 1 mm to 2 mm when the legs were inserted in the arc body 11. After sintering the arc tube chamber 14 had an inside diameter of about 2 mm.

Figure 7:
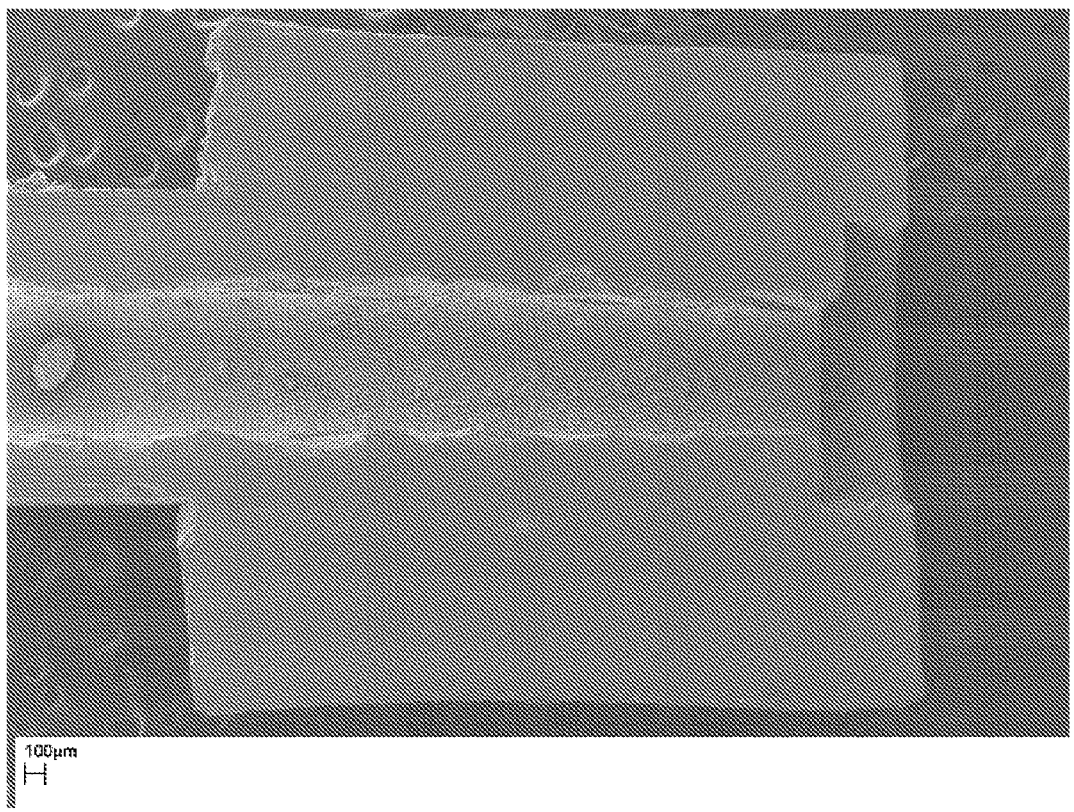
FIG. 7 is a photograph of a section of a YAG arc tube.

The legs 12, 13 and arc body 11 were sintered according to the following schedule. That is, the components were heated at a rate of 300° C./hour to 1300° C., which was maintained for a resident time of about two hours to five hours. Then the temperature was increased over a one to two hour period to 1500° C., which was maintained for a resident time ranging from about two hours to eight hours. The temperature was then increased over a three hour to six hour time period to about 1800° C., which was maintained for a resident time of about five hours. During this co-sintering process, the oxide mixture composing the arc body reacts to form YAG and shrinks onto the legs to form the arc tube having an undetectable interface between the legs and arc body as shown in FIG. 4. A photograph of an arc tube composed of YAG was taken using an electron microscope at a magnification of 50× and is displayed as FIG. 7. As shown, the above-described oxide powder mixture and method of making the arc tube eliminates the interface at the arc body and the legs.

As described above with respect to the ceramic discs, the arc tubes may also undergo a hot isostatic pressurization to remove any residual porosity in the YAG arc tube. For example, the arc tube may be heated to 1800° C. at 25,000 psi for a resident time of about 2 hours. In addition, the arc tube may be annealed under atmospheric conditions at 1200° C. for about twenty-four hours to remove any discoloration in the ceramic material. Other annealing schedules may be used sufficient to accomplish this task.

The arc tube thus produced is composed of sintered transparent yttrium aluminum garnet having the cross-sectional box-like configuration illustrated in FIG. 4. The arc body 11 has tubular middle wall 19 disposed between opposing end walls 17 and 18 forming the chamber 14. Each of the legs 12 and 13 is also tubular and each having an interior that is in communication with the chamber 14 for insertion of an electrode into the chamber 14. With respect to the arc body 11, the middle wall 19 is disposed substantially perpendicular with respect to each of the end walls 17 and 18. In addition, a longitudinal axis 20 of the legs 12 and 13 is substantially perpendicular to each of the end walls 17 and 18 of the arc body.

In this manner, an arc tube composed of a sintered transparent yttrium aluminum garnet is made. The YAG made according the foregoing method may achieve an in-line transmission of at least 75% for various known applications, and may reach an in-line transmission as high as 80% necessary for optical applications such as automotive headlamps. The method provides an inexpensive alternative to current methods and supplies that are present for making YAG ceramic components. With respect to the arc tube described herein, the components formed through extrusion or injection molding, have advantages over YAG arc tubes made from slip casting systems or methods. With respect to the configuration of the arc tube 10 shown in FIG. 4, the arc tube is more thermally robust than the configuration of the arc tubes similar to the configuration of the arc tube in FIG. 2. More specifically, the position of the electrodes 15 and 16 within the chamber may be changed or varied without subjecting the arc tube to increasing thermal stresses. Thermal stress as used herein shall mean the level of stress generated or caused by temperature gradients across thickness of the arc tube.

Figure 1:
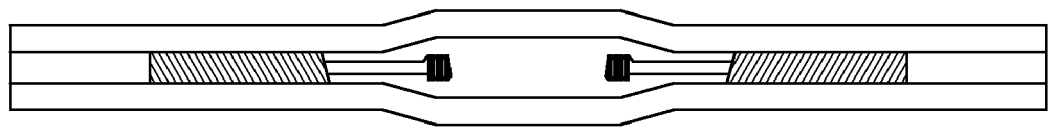
FIG. 1 is a sectional view of a prior art YAG arc tube fabricated from slip casting.
Figure 2:
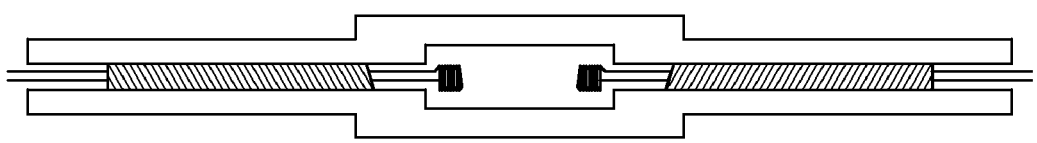
FIG. 2 is a sectional view of a prior art PCA arc tube fabricated from injection molding or extrusion.
Figure 5A:
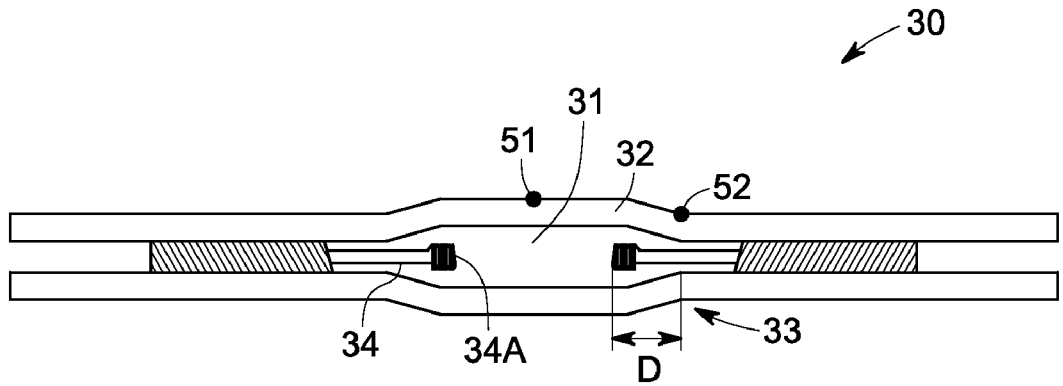
FIG. 5A is a sectional view of a prior art YAG arc tube.
Figure 5B:
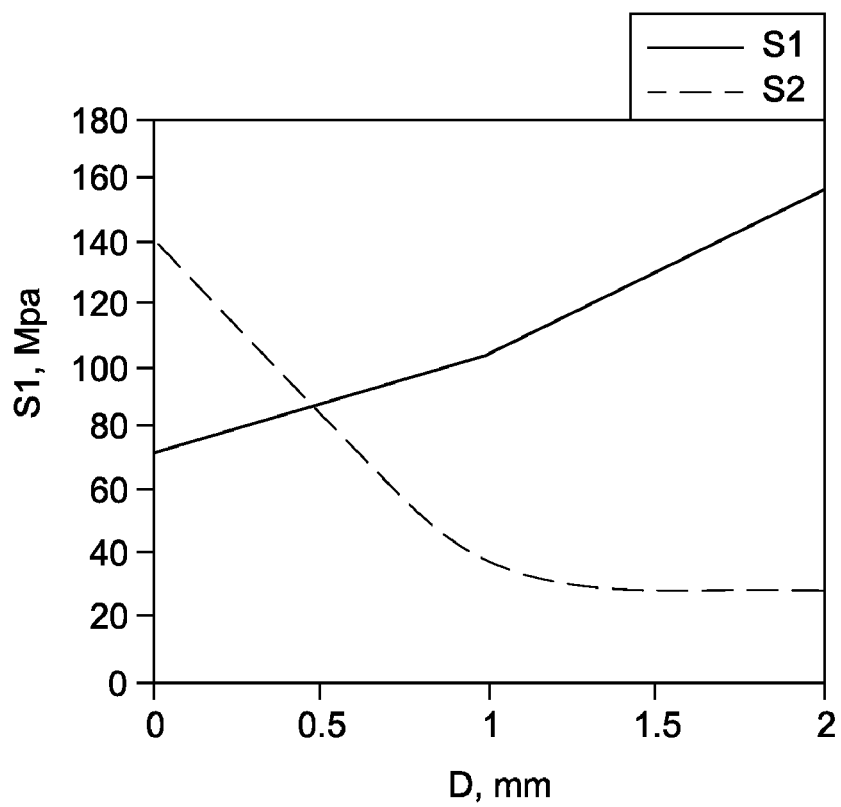
FIG. 5B is a graph of thermal modeling test results of the YAG arc tube shown in FIG. 5A.
Figure 6A:
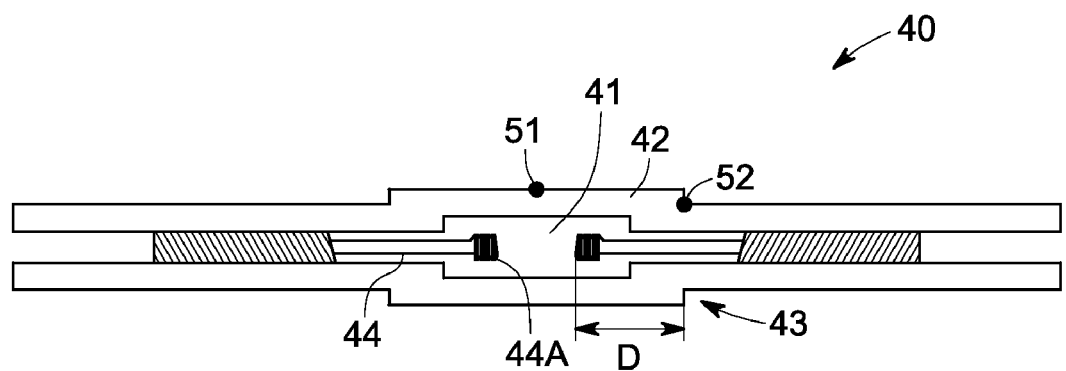
FIG. 6A is a sectional view of a YAG arc tube.
Figure 6B:
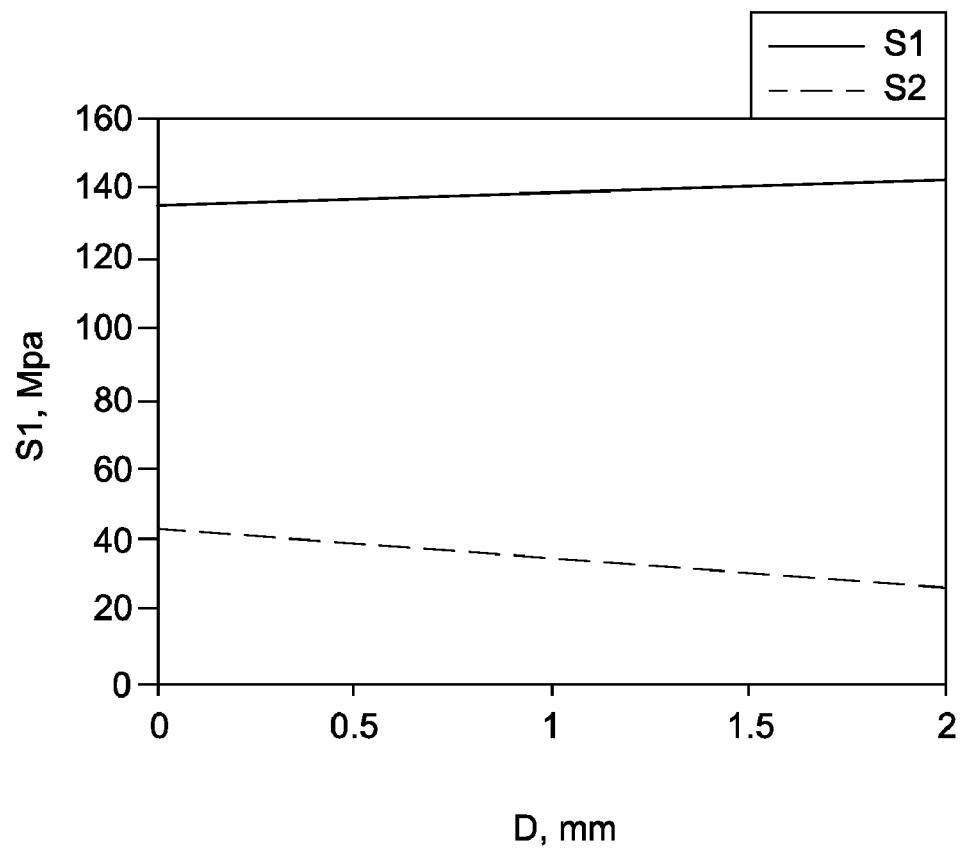
FIG. 6B is a graph of thermal modeling test results of the YAG arc tube shown in FIG. 6A.

Thermal stress modeling was conducted for the oval-shaped arc tube 30 shown in FIG. 5A, which is similar to the arc tube illustrated in FIG. 2; and, thermal stress modeling was conducted for the arc tube 40 shown in FIG. 6A, which has the box-like cross sectional configuration similar to the arc tube of FIG. 4. Both model arc tubes were composed of YAG. The diameter of chamber 31 in arc tube 30 in FIG. 5A was 2.2 mm; and, the diameter of the chamber 41 in the arc tube 40 in FIG. 6A was 2.0 mm. The thermal stress modeling test results for the oval-shaped arc tube 30 in FIG. 5A are shown in the FIG. 5B graph, and the thermal stress modeling test results for the arc tube 40 in FIG. 6A are shown in the FIG. 6B graph.

The point labeled S1 in each of the FIGS. 5A and 6A represents a stress point on the arc tube walls 32 and 42 at the center of the respective arc tube chambers 31 and 41. The point S2 in each of the FIGS. 5A and 6A represent a stress point at the neck portion 33 and 43 of the respective arc tubes 30 and 40. The letter D represents the distance the tip of the tungsten electrode 34 and 44 is positioned from the neck portion 33 and 43 of the arc tubes 30 and 40 at point S2.

A thermal stress measurement in megapascal was calculated for each of three different positions of the electrode tip for each arc tube 30 and 40. These calculations are plotted on the graphs in FIG. 5B and FIG. 6B with the thermal stress calculation on vertical axis, and the distance D on horizontal axis. For the first calculation the electrode 34 and 44 was positioned 2 mm from point S1, and the arc gap, or distance between the electrode tips 34A and 44A was 4 mm. For the second calculation the electrode 34 and 44 was positioned 1 mm from point S1, and the arc gap was 6 mm. For the third calculation the electrode 34 and 44 was positioned at the point S1, or 0 mm from point S1; and, the arc gap was 8 mm.

With respect to FIG. 5B, the graph illustrates that the thermal stress on the arc tube walls is strongly dependant on the position of the electrode tip in the arc tube chamber. As the electrode tip is positioned closer to points. S1 or S2, the thermal stress increases at these respective points S1 and S2; and, the thermal stress decreases when the electrode tip is positioned farther from the respective points S1 or S2. The optimal position of the electrode tip was found to be about 0.5 mm from point S2.

In contrast, the thermal stress caused by the activated electrodes 34 and 44 in the arc tube of FIG. 6A remains relatively constant despite changing the position of the electrode tips 34A and 44A within the respective chambers 31 and 41. Indeed, the thermal stress at S2 of the arc tube 40 in FIG. 6A does not exceed about 42 Mpa. Accordingly, the design of the arc tube 40, and arc tube chamber 41, is not limited by the thermal stress at the point S2 in the neck portion, which provides more flexibility in the design of the arc tube.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An arc tube for a high intensity discharge lamp, comprising:
an arc body and at least two legs connected to the arc body wherein the legs and the arc body comprise yttrium aluminum garnet, wherein the arc body and the legs formed through extrusion of a moldable mass of a mixture comprising yttrium oxide, aluminum oxide, and wherein the yttrium aluminum garnet has an in-line transmission of at least 50% and comprises Si in an amount of about 200 ppm to about 500 ppm by weight of Si to yttrium aluminum garnet, and Mg in an amount of 150 ppm to about 600 ppm of Mg to yttrium aluminum garnet.

2. The arc tube of claim 1 wherein the extruded yttrium aluminum garnet form has a green density of 40% to 60% prior to being sintered.

3. The arc tube of claim 1 wherein the arc tube includes an arc body and at least two legs connected to the arc body, and the arc body having a chamber.

4. The arc tube of claim 1 wherein the yttrium aluminum garnet has an in-line transmission of at least 75%.

5. The arc tube of claim 1 wherein the yttrium aluminum garnet has an in-line transmission of at least 80%.

6. The arc tube of claim 1 further comprising Si in an amount of about 420 ppm by weight of Si to yttrium aluminum garnet, and Mg in an amount of 270 ppm of Mg to yttrium aluminum garnet.

7. An arc tube for a high intensity discharge lamp, comprising:
an arc body and at least two legs connected to the arc body wherein the legs and the arc body comprise yttrium aluminum garnet,
the arc body having a chamber defined by a tubular middle wall and two opposing end walls and the middle wall is substantially perpendicular with respect to each of the end walls and each of the legs is connected to a respective end wall, and wherein the yttrium aluminum garnet has an in-line transmission of a least 50% and comprises Si in an amount of about 200 ppm to about 500 ppm by weight of Si to yttrium aluminum garnet, and Mg in an amount of 150 ppm to about 600 ppm of Mg to yttrium aluminum garnet.

8. The arc tube of claim 7 wherein the yttrium aluminum garnet contains Si in an amount of about 420 ppm by weight of Si to the yttrium aluminum garnet and contains Mg in an amount of about 270 ppm by weight of Mg to the yttrium aluminum garnet.

9. The arc tube of claim 7 wherein each of the legs has a longitudinal axis that is substantially perpendicular to the respective end walls of the arc body.

* * * * *